United States Patent [19]

Farey et al.

[11] 4,366,964
[45] Jan. 4, 1983

[54] WHEELCHAIR HAND RIM

[75] Inventors: Francis A. Farey, 2060 Monterey Ave., Menlo Park, Calif. 94025; Richard A. Fayram, Palo Alto, Calif.

[73] Assignee: Francis Arden Farey, Menlo Park, Calif.

[21] Appl. No.: 215,481

[22] Filed: Dec. 11, 1980

[51] Int. Cl.³ .............................................. B62M 1/14
[52] U.S. Cl. .............................. 280/242 WC; 74/558; 297/DIG. 4
[58] Field of Search ........... 280/242 R, 242 WC, 249, 280/289 WC; 297/DIG. 4; 301/6 D; 74/552, 557, 558

[56] References Cited

U.S. PATENT DOCUMENTS

| 24,075 | 2/1895 | Frisbie | 74/552 |
|---|---|---|---|
| 1,872,052 | 8/1932 | Wrigley | 74/552 |
| 2,311,269 | 2/1943 | Van Cleave | 74/552 |
| 2,685,214 | 8/1954 | Maud | 74/552 |
| 2,828,645 | 4/1958 | Wilfert | 74/557 |
| 2,938,738 | 5/1960 | La Rue et al. | 280/249 |
| 3,282,605 | 11/1966 | Nihlean et al. | 297/DIG. 4 |
| 3,331,260 | 7/1967 | Zeller | 74/552 |
| 3,555,925 | 1/1971 | Bowser | 74/552 |
| 4,039,199 | 8/1977 | Quinby | 280/242 |

FOREIGN PATENT DOCUMENTS

| 1105271 | 11/1955 | France | 74/552 |
|---|---|---|---|
| 7606497 | 12/1977 | Netherlands | 74/552 |

*Primary Examiner*—Joseph F. Peters, Jr.
*Assistant Examiner*—Ross Weaver
*Attorney, Agent, or Firm*—Townsend and Townsend

[57] ABSTRACT

A wheelchair hand rim that provides improved control and mobility has a cross-sectional contour that is configured to optimize the gripping surface and finger wrap over widely differing angles. The contour (taken at top dead center) is characterized by a lower curved portion of sufficient radius to provide a firm finger grip, a generally vertical inboard portion, an outboard gently curved portion that slopes inboard from bottom to top, and an upper curved portion that includes an outboard segment of a first radius sufficient to provide a firm upper palm grip and an inboard portion of a second, smaller radius that is still sufficient to provide a smooth rest for the thumb of the user. A hand rim suitable for users having extremely limited grip strength has a peripheral configuration that is not circular, but rather undulating.

14 Claims, 5 Drawing Figures

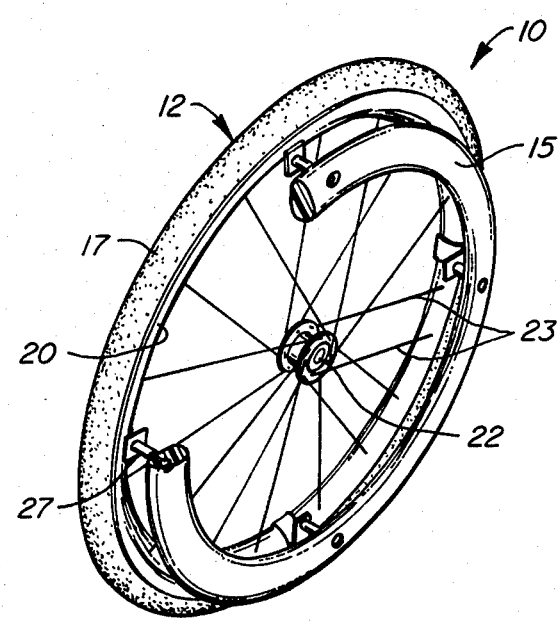
FIG._1.
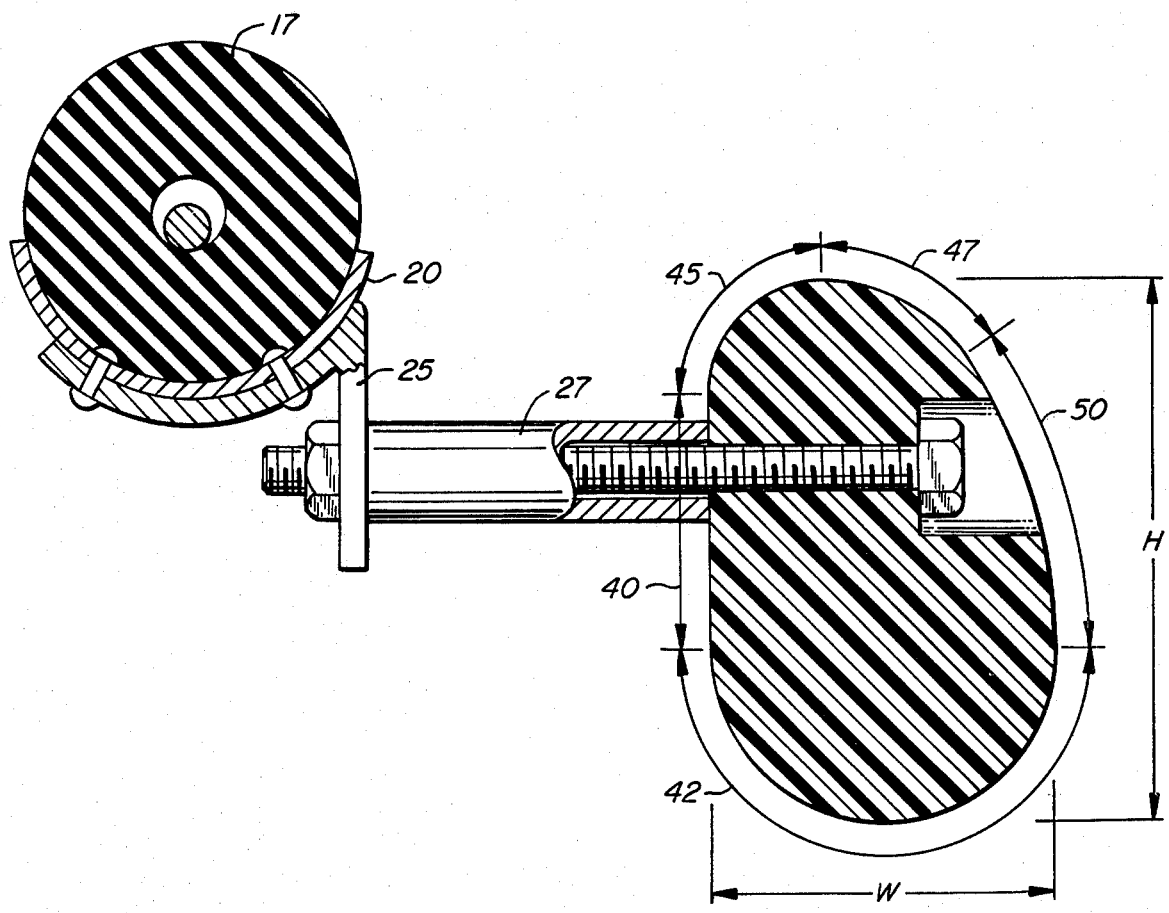
FIG._2.

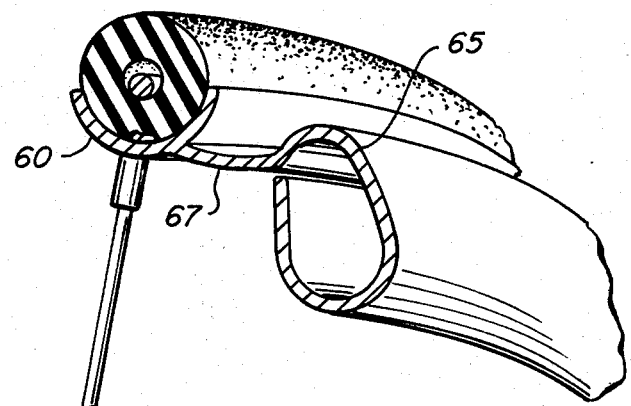
FIG._3.
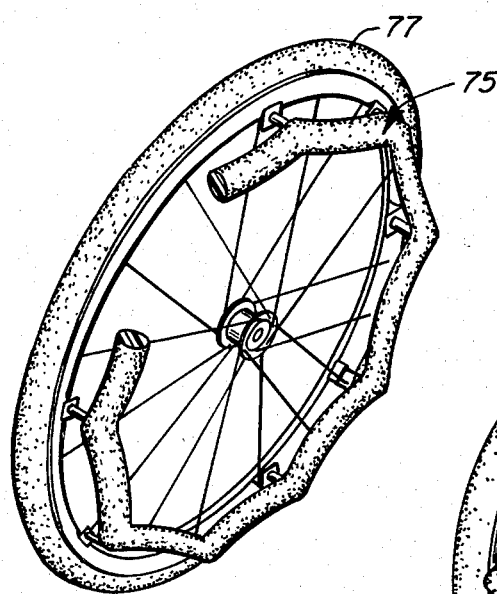
FIG._4.
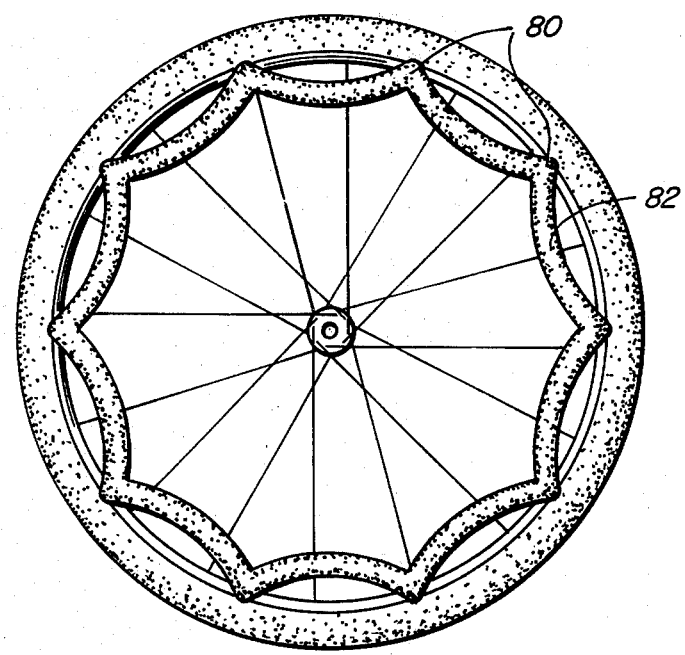
FIG._5.

WHEELCHAIR HAND RIM

FIELD OF THE INVENTION

The present invention relates generally to wheelchairs, and more particularly to an improved hand rim for a hand-propelled wheelchair.

BACKGROUND OF THE INVENTION

The majority of hand-propelled wheelchairs in present use are equipped with tubular steel hand rims of approximately 21 inches in diameter. The cross sectional contour of the hand rim is a circle of approximately ⅜-inch diameter. Each hand rim is mounted outboard of its respective wheel by four tubular spacers (standoffs) to provide a clearance of approximately ¾ of an inch. While generally suitable for their intended purpose of propelling and maneuvering the wheelchair, the standard hand rim has numerous disadvantages.

The relatively small diameter (⅜ of an inch) of the hand rim tubing section provides only a limited gripping surface for the user. Thus, when the user attempts to propel the chair in difficult situations, as when going up ramps, traveling on soft carpets, or traversing rough terrain, he often experiences difficulty and must resort to such tactics as placing his hands over both tire and hand rim to exert sufficient torque. The limited surface area of the standard hand rim also limits the ability of the user to properly and safely control and brake the wheelchair while descending a ramp. Due to the lack of surface area the user often finds it necessary to wrap his fingers around most of the tube diameter to get a sufficient grip, and thus tends to get his fingers caught up on the standoffs. This problem is particularly acute when the user is descending a ramp.

Even assuming that the user is able to satisfactorily propel and control the wheelchair, and it can probably be assumed that this is the case much of the time, it is clear that mobility can be improved inasmuch as the conventional hand rim does not fit the user's hand in a comfortable manner, especially when extra torque or gripping action must be applied. Thus, a considerable amount of the user's effort is expended in gripping the hand rim rather than in applying torque to propel the wheelchair.

There are on the market some lightweight wheelchairs that are equipped with integral hand rim and wheel rim assemblies. For example, U.S. Pat. No. 2,938,738 discloses a combined hand rim and wheel rim for a wheelchair that is preferably formed from a single extruded section. The hand rim has a non-circular cross-sectional contour. This construction provides a continuous web between the wheel rim and the hand rim, thus avoiding the problem wherein the user's fingers get caught up in the stand offs. However, this configuration has the disadvantage that it limits the grip applicable to the hand rim since the user's fingers cannot fully encircle the hand rim.

In recent years wheelchair sports have become increasingly popular, and have prompted a number of improvements directed toward making wheelchairs more easily and efficiently maneuverable. Sport wheelchairs are often equipped with hand rims formed from a slightly larger diameter tubing which improves the grip to some extent. The grip may be further improved by providing a soft vinyl surface on the hand rim, but this has the disadvatage of considerably diminishing the durability of the hand rim.

A different set of problems is presented for those users with partial quadraplegia and thus limited grip strength. A typical prior art hand rim for such users utilizes a circular ring similar to a regular hand rim, having a plurality of radially or axially projecting handles or push rods which the user may push with his palm without having to grip. These so-called "projection" hand rims are useful when required, but are heavy and relatively expensive. Moreover, they are extremely awkward and unsuitable for general use. The main problem is that the push rods easily becomes caught up on draperies, furniture, and the like. U.S. Pat. No. 4,039,199 discloses a system wherein the push rods are partially retracted towards the bottom of their travel, thus at least partially obviating this problem. However, this result is achieved at the expense of the complexity.

SUMMARY OF THE INVENTION

The present invention is a wheelchair hand rim that enables the user to propel the chair with the expenditure of significantly less energy, thus greatly increasing mobility. The user is able to apply increased torque with less grip effort on all points of the power stroke in both the forward and backward directions, and is left with more reserve for difficult situations.

Broadly, the improved control and mobility are achieved by a hand rim cross-sectional contour that is configured to optimize the gripping surface and finger wrap over the widely differing angles on the different parts of the stroke. The cross-sectional contour of the hand rim (taken at top dead center for definiteness) is characterized by a lower curved portion of sufficient radius (e.g., ⅜ of an inch) to provide a firm finger grip, a generally vertical inboard portion, an outboard gently curved portion (e.g., 1 ⅛ inches radius) that slopes inboard from bottom to top, and an upper curved portion that includes an outboard segment of a first radius (e.g., ⅜ of an inch) sufficient to provide a firm upper palm grip and an inboard portion of a second, smaller radius (e.g. ¼ of an inch) that is still sufficient to provide a smooth rest for the thumb of the user. The inboard portion of the contour is configured in a generally straight and vertical manner in order to minimize overall width and material use.

The contour is optimized among various competing considerations. For example, a large gripping surface is desirable for increased friction area, but making the hand rim section larger tends, at some point, to decrease the user's ability to wrap his fingers effectively. This is most noticeable at the ends of the stroke since wrist flexure is limited. The overall height (e.g., 1 1/6 inches) represents an optimization that provides the most gripping surface area while still allowing the user to wrap his fingers effectively around the lower curved portion, even though wrist flexure is limited.

The present invention achieves the increased mobility by allowing the user to utilize portions of the hand that are underutilized with a conventional hand rim. For example, when pushing the chair forward, the user tends to press his hand downward and sometimes slightly inward (towards the center of the chair) with the thumb and upper palm doing most of the work. However, the outboard sloping gently curved portion and its smooth transition to the lower curved surface provides a more natural gripping surface that utilizes the fingers and lower palm so that less of the user's energy is needed to grip the hand rim. Similarly, on the backward stroke, the tendency is for the user to squeeze the hand rim at the beginning of the stroke, pulling upward, with the fingers doing the majority of the work. However, the hand rim of the present invention provides an elongate contour that permits more effective use to be made of the entire palm. Again, this allows the user to expend less energy in gripping the hand rim, leaving more to apply torque to the hand rim.

The outboard gently curved portion having a radius of approximately 1 ⅛ inches tends to maximize surface friction between the palm and the hand rim. The inward slope from bottom to top further improves hand traction since the outer surface of the hand rim tends to be more perpendicular to the direction from which hand force tends to be applied than would be the case were this surface vertical. The sloping gently curved portion blends smoothly with the upper curved portion to provide an effective palm grip surface. While the curvature of the upper curved portion increases progressing inwardly, the inboard segment of ¼-inch radius still provides a smooth surface on which the user's thumb rests while leaving a more generous ⅜-inch radius over the top for providing more traction area.

According to a further aspect of the present invention, there is provided an improved hand rim suitable for users having extremely limited grip strength. This hand rim avoids the need for radially or axially projecting push rods that tend to get caught up on furniture and other objects in the environment. At the same time, the hand rim is of a simple and lightweight construction. Broadly, the hand rim according to this aspect of the present invention achieves the benefit of the projection hand rim by utilizing a hand rim peripheral configuration that is not circular, but rather undulating. Thus, the hand rim configuration is characterized by a plurality of crests, or regions of maximum radial dimension, with a corresponding plurality of intervening troughs, or regions of minimum radial dimension. Although the precise number of undulations is not critical, too few would force the user to use a long stroke while too many would minimize the area on which the palm presses. It has been found that a rim should typically have 8–12 undulations, with 10 being preferred.

Since the undulating hand rim is primarily directed to users having extremely limited ability to grip, such users would probably not avail themselves of the optimum gripping characteristics of the improved hand cross-sectional rim contour described above. Thus, the cross-sectional contour of the undulating hand rim may be chosen for ease of fabrication, and might, for example, be characterized by a width of ¾ of an inch, an overall height (radial extension) of approximately 1 ¼ inches, and upper and lower semi-circular portions of ⅜ inch radius. However, since the degree of gripping ability tends to vary along a continuum, users with partial gripping ability can benefit from the improved hand rim cross-sectional contour for some situations, and use the undulating peripheral configuration for others.

It will be appreciated that the essentially smooth and continuous peripheral configuration of the undulating hand rim minimizes the problems of getting caught up on objects in the environment. At the same time, the crests of the undulations provide sufficient radial projection against which the extremely limited grip user may push.

For a further understanding of the nature and advantages of the present invention, reference should be made to the remaining portions of this specification and to the attached drawings.

BRIEF DESCRIPTION OF THE DRAWINGS

FIG. 1 is an isometric view of a wheelchair wheel and hand rim according to the present invention;

FIG. 2 is a cross-sectional view showing the wheel rim and improved hand rim contour;

FIG. 3 is an oblique sectional view of an alternate embodiment of the present invention;

FIG. 4 is an isometric view of an undulating hand rim according to the present invention; and FIG. 5 is a side elevational view of a wheelchair wheel and undulating hand rim according to the present invention.

DETAILED DESCRIPTION OF THE INVENTION

FIG. 1 is an isometric view showing a wheelchair wheel and hand rim assembly 10 according to the present invention. As is well known in the art, such an assembly comprises a wheel 12 and a hand rim 15 mounted concentrically thereto and spaced slightly outboard thereof. FIG. 2 is a cross-sectional view taken through a vertical diametral plane, illustrating the cross-sectional contour of hand rim 15. Wheel 12 is of any standard construction, for example comprising a tire 17, a wheel rime 20, a hub 22, and a plurality of spokes 23. Hand rim 15 has a peripheral configuration that is circular with a diameter slightly less than that of wheel 12. A plurality of equally spaced brackets 25 are mounted to wheel rim 20, as by riveting or welding, and hand rim 15 is bolted to the brackets. Hand rim 15 is spaced outboard of wheel rim 20 by tubular metal standoffs 27. As is well known, a user propels the wheelchair in either a forward or backward direction by grasping one or both hand rims and applying torque thereto.

The present invention utilizes a hand rim cross-sectional contour that is decidedly non-circular. The description that follows will be in terms of the cross section taken through a vertical diametral plane at top dead center. Locations on the hand rim contour will be described in terms of "upper" for radially outer, "lower" for radially inner, "inboard" for the side nearest the wheel, and "outboard" for the side farthest from the wheel. The dimensions given in the following description represent a hand rim contour that has been found to be well suited for users having hands in a range of normal sizes. Naturally, for users with especially large hands or small hands, the contour dimensions could be appropriately scaled. Moreover, the description is for a hand rim intended for general purpose use. Special purpose hand rims such as for wheelchair sports may depart in certain respects while retaining many of the advantages.

The hand rim contour is characterized by a height, designated H, in the range of 1.0 to 1.5 inches, with 1 1/6 inches being preferred, and a width, designated W, in the range of 0.6 to 1.0 inches, with ¾ of an inch being preferred. The cross-sectional contour of the hand rim is characterized by a generally vertical inboard portion 40, a lower curved portion 42, an upper curved portion having inboard and outboard segments 45 and 47, and a gently curved outboard portion 50 that slopes inwardly from bottom to top. All the above mentioned contour portions blend smoothly into one another. Generally vertical portion 40 is typically straight. Lower curved portion 42 is preferably semicircular with a radius of curvature in the range of 0.3 to 0.5 inches, with ⅜ of an inch being preferred, thus generally defining width W. Inboard upper curved segment 45 has a radius of curvature in the range of 0.2 to 0.4 inches, with ¼ of an inch being preferred. Inboard upper curved segment 45 is quarter-circular, and blends smoothly to outboard upper curved segment 47 which has a radius of curvature in the range of approximately 0.3 to 0.5 inches, with ⅜ of an inch being preferred. Outboard curved portion 50 is relatively gently rounded, with a radius of curvature generally greater than about 0.75 inches, with 1 ⅛ inches being preferred. Portion 50, since it joins smoothly onto lower curved portion 42 at a vertical tangent, slopes generally inwardly from bottom to top, and joins tangentially to upper curved portions 47 at a height of approximately one inch above the lowermost portion of the hand rim contour.

The particular height at which standoff 27 meets hand rim 15 is generally determined by the nature of mounting brackets 30, the type of wheel rim, and the overall diameter of the hand rim. The axial length of standoffs 27 is preferably approximately ¾ of an inch. As a general matter, it is desirable for the user to be able to wrap his thumb downwardly over the top of the hand rim, either with the hand rim of the present invention or with prior art hand rims. The present invention, with or without thumb clearance, provides improved gripping over similarly mounted prior art hand rims. Typical hand rim outer diameters are in the 20 ¾ to 21 ¾ inch range, depending on the inside diameter of the particular wheel rim. Standoff 27 is typically about ¾ of an inch long, and is mounted approximately ½ an inch below the top of the hand rim contour to provide a thumb clearance of about ¾ of an inch.

Hand rim 15 may be constructed from any convenient structural material such as wood or plastic, but for relatively large production runs, it is envisioned that the hand rim be of tubular metal construction. It should be noted that the perimeter of the contour corresponds very closely to the circumference of a one-inch diameter circle. Thus, a particularly cost effective method of manufacture is to modify standard one inch diameter round tubing by passing it through rollers to impart to it the preferred contour described above. The hand rim could be finished in any suitable manner, and could be coated with frictional material is desired. While the wood and plastic versions tend to have a better "feel" to them, metal has the advantage of greater durability and greater ability to dissipate heat generated during braking.

FIG. 3 is an oblique sectioned view of an alternate embodiment of the hand rim of the present invention. This embodiment utilizes a unitary construction wherein the hand rim and wheel rim are portions of a single integrally formed metal member with a trough portion 60 defining the wheel rim, a generally tubular portion 65 defining the hand rim, and an intermediate web portion 67 serving to space the hand rim and the wheel rim apart, taking the place of the standoff mounting described above. The construction may be extruded or rolled, depending on the choice of materials. Tubular portion 65 has substantially the same outer contour as described in connection with FIG. 2. As a further variant, it is possible to fabricate the hand rim and web portions integrally, to be welded or riveted to a separate wheel rim.

Having described the cross-sectional contour of the hand rim according to the present invention, the significance of the various dimensions and the advantages derived therefrom may be described.

The overall height of approximately 1 1/6 inches provides a relatively large amount of hand rim surface for frictional engagement with the user's hand. Moreover, it will be noted that the contour allows the user to wrap his hand effectively around the hand rim while minimizing finger interference with standoffs 27. The overall height represents an optimum accommodation of competing factors. For example, since the wrist flexure is limited, the angular relationship between the hand and the hand rim varies over the stroke, and the user's ability to effective wrap his fingers around the lower part of the hand rim contour is decreased at the ends of the stroke. Thus, while a large hand rim is desirable to provide a large gripping surface, as the size and radius of curvature increase, it becomes more difficult to wrap fingers in an effective manner. Also, the curvature of outboard portion 50 tends to maximize palm grip, and unduly increasing the overall height tends to require the increase of radius of curvature of portion 50 beyond a useful value. Moreover, an increasingly large hand rim inhibits the user's ability to let the hand rim slide through his hand.

Similarly, the overall width represents a compromise. As a general matter, it is desirable to maintain a minimum hand rim width in order to minimize the overall wheelchair width and facilitate access of the user and wheelchair into tight places. At the same time, it is desirable for control and comfort purposes to have a relatively gentle curvature. The full ⅜-inch radius at the lower portion of the hand rim affords a firm grip and smooth control when the user is descending ramps, while defining an overall width that is reasonable. It should be noted that making inboard generally vertical portion 40 straight miminizes the material usage and overall width of the hand rim, and further provides good finger traction. Where the above factors are not critical, some degree of curvature may be acceptable or desirable.

Sloping outboard portion 50, being gently rounded, tends to maximize surface friction between the user's palm and the hand rim while the inward tilt (from bottom to top) further improves traction by allowing the user to more readily apply force perpedicular to the hand rim. Outboard upper curve segment 47, blending smoothly with outboard curved portion, provides an effective palm grip surface, while the ¼-inch radius of inboard upper curved segment 45 is sufficient to provide a smooth surface for the user's thumb.

FIGS. 4 and 5 are isometric and side elevational views illustrating a further aspect of the present invention. In connection with the hand rim shown in FIGS. 1–3, it was at all times assumed that while the cross-sectional contour was non-circular, the peripheral configuration was circular. FIGS. 4 and 5 show a hand-rim 75 mounted to a wheel 77 wherein the hand rim peripheral configuration is not circular, but rather is undulating. That is, the maximum radial extent of the hand rim periphery varies cyclically with angular position around the rim. With particular reference to FIG. 5, there are shown 10 equally spaced crests 80 (i.e. regions of maximum radial extent) with intervening troughs (regions of minimum radial dimension). As an example of the radial variation, a trough to crest dimension of approximately 1 ½ inches should be considered typical. While the nature of the undulations may be such that crests 80 and troughs 82 are generally characterized by equal, but oppositely directed curvatures, it is preferred that the crests be somewhat sharper and more cusp-like. However, the periphery is still smooth and continuous. The cross-sectional contour of hand rim 75 is generally of lesser significance since this undulating hand rim is designed primarily for users having extremely limited grip strength. However, the contour may be similar to that described above in connection with FIGS. 1-3, or may be a simpler contour, such as that provided by inboard and outboard vertical straight portions with semicircular upper and lower portions for an overall width of approximately ¾ of an inch and an overall height of approximately 1 ¼ inches.

In summary, it can be seen that the present invention provides that wheelchair hand rim that permits the user to make the most effective use of his effort. The preferred hand rim cross-sectional contour is configured so that the hands and palms tend to naturally fit and close around the hand rim when pushing and pulling thereon. The contour allows the user to utilize portions of his hand that tend to be underutilized with prior art hand rims, with the slope of the outboard gently curved portion allowing the user to more effectively apply force to the hand rim. The undulating hand rim, whether or not formed with the preferred cross-sectional contour, provides the user with extremely limited grip strength the benefits of a projection hand rim while minimizing the tendency for the rim to get caught up on objects in the environment.

While the above provides a full and complete disclosure of the preferred embodiments of the invention, various modifications, alternate constructions, and equivalents may be employed without departing from the true spirit and scope of the invention. For example, the above description was based on a hand rim formed from a single structural material. However, a composite construction could be used to provide differing coefficients of friction at various points on the cross-section. Moreover, while spoked wheels are disclosed, the present invention could be used with other types of wheels. Therefore, the above description and illustrations should not be construed as limiting the scope of the present invention which is defined by the appended claims.

We claim:

1. A hand rim for a wheelchair, said hand rim having a cross section at top dead center characterized by:
   an inboard generally vertical portion;
   an outboard gently curved portion sloping inboard from bottom to top;
   a lower curved portion of sufficient radius for firm finger grip and smooth control by a user, said lower curved portion defining the overall width of said hand rim;
and
   an upper curved portion spaced upwardly from said lower curved portion by said inboard generally vertical portion and said outboard gently curved portion, the curvature of said upper curved portion being greater adjacent said inboard generally vertical portion than adjacent said outboard gently curved portion;
   said outboard gently curved portion, said lower curved portion, and said upper curved portion together defining a contour that optimizes engagement with said user's hand to increase said user's ability to efficiently propel said wheelchair.

2. The invention of claim 1 wherein said inboard generally vertical portion is straight.

3. The invention of claim 1 wherein said upper curved portion includes an outboard segment of a first radius sufficient to provide a firm upper palm grip and an inboard segment of a second radius less than said first radius but still sufficient to provide a smooth rest for the thumb of said user.

4. The invention of claim 3 wherein said outboard segment of said upper curved portion has a radius in the range of approximately 0.3 to 0.5 inches and said inboard segment of said upper curved portion has a radius in the range of 0.2 to 0.4 inches.

5. The invention of claim 1 wherein the overall height of said hand rim is greater than said overall width and is in the range of approximately 1.0 to 1.5 inches, and wherein said overall width is in the range of approximately 0.6 to 1.0 inches.

6. The invention of claim 1 wherein said lower curved portion is semi-circular with a radius in the range of 0.3 to 0.5 inches, and wherein said outboard gently rounded portion is circular with a radius greater than 0.75 inches.

7. The invention of claim 1 wherein said hand rim has a circular peripheral configuration.

8. The invention of claim 1 wherein said hand rim has an undulating peripheral configuration.

9. A wheelchair hand rim for use with a wheelchair wheel, the hand rim having a cross section at top dead center characterized by:
   an overall height sufficient to allow substantial hand interface therewith;
   a lower curved portion of sufficient radius to provide a firm finger grip for a user;
   an upper curved portion having a first outboard segment of sufficient radius to provide a firm upper palm grip and an inboard segment of relatively small radius but sufficient to provide a smooth rest for the thumb;
   an outboard gently rounded portion forming a transition between said upper curved portion and said lower curved portion, said outboard gently rounded portion tilting inwardly toward said upper curved portion;
   said inwardly tilting gently rounded portion blending smoothly with said outboard segment of said upper curved portion to provide an effective palm grip perpendicular to the direction in which force tends to be applied;
   an inboard generally vertical portion to minimize the overall width of said hand rim; and
   means for mounting the hand rim to the wheelchair wheel at points along said inboard generally vertical portion adjacent said inboard segment.

10. The invention of claim 9 wherein said overall height is greater than said overall width and is in the range of approximately 1.0 to 1.5 inches and wherein said overall width is in the range of approximately 0.6 to 1.0 inches.

11. The invention of claim 9 wherein said lower curved portion is semicircular with a radius in the range of 0.3 to 0.5 inches, and wherein said outboard gently rounded portion is a circular arc with a radius greater than 0.75 inches.

12. The invention of claim 9 wherein said outboard segment of said upper curved portion has a radius in the range of approximately 0.3 to 0.5 inches and said inboard segment of said upper curved portion has a radius in the range of 0.2 to 0.4 inches.

13. The invention of claim 9 wherein said inboard generally vertical portion is generally straight, said overall width is about ¾ of an inch, said overall height is about 1 1/6 inches, said lower curved portion is semicircular, said outboard gently rounded portion has a radius of curvature of about 1 ⅛ inches, and said upper curved portion has an inboard segment having a ¼-inch radius of curvature and an outboard segment having a ⅜-inch radius of curvature.

14. A wheelchair hand rim having a cross section at top dead center characterized by:
- an overall height in the range of 1.0 to 1.5 inches, being sufficient to allow substantial hand interface therewith;
- a lower curved portion of radius of curvature in the range of 0.3 to 0.5 inches to provide a firm finger grip for a user;
- an upper curved portion having a first outboard segment of radius of curvature in the range of 0.3 to 0.5 inches to provide a firm upper palm grip and an inboard segment of radius of curvature in the range of 0.2 to 0.4 inches to provide a smooth rest for the thumb;
- an outboard gently rounded portion of radius of curvature greater than 0.75 inches forming a transition between said upper curved portion and said lower curved portion, said outboard gently rounded portion tilting inwardly toward said upper curved portion;
- said inwardly tilting gently rounded portion blending smoothly with said outboard segment of said upper curved portion to provide an effective palm grip perpendicular to the direction in which force tends to be applied; and
- an inboard generally vertical generally straight portion to minimize the overall width of said hand rim.

* * * * *